(12) United States Patent
Humphrys et al.

(10) Patent No.: US 12,285,777 B2
(45) Date of Patent: Apr. 29, 2025

(54) SEALANT SMOOTHING TOOL (71) Applicant: Airbus Operations Limited, Bristol (GB)

(72) Inventors: Benjamin Humphrys, Bristol (GB); Hannah Barker, Bristol (GB); David Jones, Bristol (GB)

(73) Assignee: Airbus Operations Limited, Bristol (GB)

( * ) Notice: Subject to any disclaimer, the term of this patent is extended or adjusted under 35 U.S.C. 154(b) by 525 days.

(21) Appl. No.: 17/678,671

(22) Filed: Feb. 23, 2022

(65) Prior Publication Data

US 2022/0266292 A1 Aug. 25, 2022

(30) Foreign Application Priority Data

Feb. 24, 2021 (GB) ...................................... 2102635

(51) Int. Cl.
  *B05C 17/10* (2006.01)
  *B05C 11/02* (2006.01)
  *B64F 5/10* (2017.01)

(52) U.S. Cl.
  CPC ............ *B05C 17/10* (2013.01); *B05C 11/023* (2013.01); *B64F 5/10* (2017.01)

(58) Field of Classification Search
  CPC ... B05C 17/10; B05C 11/023; B25B 27/0092; E04F 21/16; E04F 21/165; E04F 21/1652
  See application file for complete search history.

(56) References Cited

FOREIGN PATENT DOCUMENTS

| DE | 10 42 877 | 11/1958 |
| DE | 91 08 560 | 8/1991 |
| DE | 10 2017 223 569 | 6/2019 |
| EP | 0 339 541 | 11/1989 |
| WO | 2005/112688 | 12/2005 |
| WO | 2010/093490 | 8/2010 |
| WO | WO-2020041868 A1 * | 3/2020 ........... B05C 11/044 |

OTHER PUBLICATIONS

Extended European Search Report for Application No. EP 22158101.0, eight pages, dated Jul. 6, 2022.
Combined Search and Examination Report for GB2102635.6, dated Nov. 25, 2021, 9 pages.

* cited by examiner

*Primary Examiner* — Shay Karls
(74) *Attorney, Agent, or Firm* — Nixon & Vanderhye P.C.

(57) ABSTRACT

A sealant smoothing tool for smoothing sealant in a gap between two aircraft parts is disclosed including a main body having a base surface for abutting sliding along a top surface of the aircraft parts, a spatula holder for holding a spatula, the spatula holder being configured to movably mount the spatula relative to the main body, and a resilient biasing member, configured to provide a biasing against the spatula or the spatula holder, such that the spatula supplies a biasing force to the sealant. An aircraft having two parts sealed by the sealant smoothing tool, a kit of parts including a sealant smoothing tool and one or more spatulas, and a method of smoothing sealant to seal a gap between two aircraft parts are also disclosed.

17 Claims, 6 Drawing Sheets

SEALANT SMOOTHING TOOL

CROSS RELATED APPLICATION

This application claims priority to United Kingdom Patent Application GB 2102635.6, filed Feb. 24, 2021, the entire contents of which is hereby incorporated by reference.

BACKGROUND OF THE INVENTION

The present disclosure relates to sealant smoothing tools.

The present invention concerns a sealant smoothing tool. More particularly, but not exclusively, this invention concerns a sealant smoothing tool for smoothing sealant in a joint gap between two aircraft parts.

The invention also concerns a kit of parts comprising a sealant smoothing tool and one or more spatulas, and methods of smoothing sealant to seal a gap between two aircraft parts.

In the manufacture of aircraft, external surfaces are produced from formed panels. If an external surface is fabricated from more than one panel, then the adjacent panels are required to be free from steps or gaps in order to reduce aerodynamic drag during flight. However, there is a manufacturing tolerance in the manufacture of the panels. Thus, small gaps will inevitably be present between edge surfaces of the panels of an aircraft after the panels have been assembled into a final structure. To reduce aerodynamic drag, reduce the likelihood corrosion, and improve aesthetic appearance, these gaps must be sealed before a final layer of painting of the panels is performed. This is usually done with a flexible filler material such as polysulphide or polythio-ether two-component sealant, which then cures to form an elastomeric solid that fills the gap.

Generally, the sealant is applied by a cartridge gun, and thereafter is smoothed by a flat edge spatula. Smoothing the sealant with a flat edged spatula is skilled work, and acceptable results require some attention to detail and some manual skill and dexterity at each stage of the activity. Thus, results from smoothing sealant in this way are heavily dependant on the experience of the user of the spatula. In addition, it may take several attempts involving re-work to correctly apply sealant to the gap, which may delay the final stages of the production of an aircraft or aircraft part.

The present invention seeks to mitigate the above-mentioned problems. Alternatively or additionally, the present invention seeks to provide an improved sealant smoothing tool, a kit of parts comprising a sealant smoothing tool and one or more spatulas, and/or method of smoothing sealant to seal a gap between two aircraft parts.

SUMMARY OF THE INVENTION

According to a first aspect of the invention, there is provided a sealant smoothing tool for smoothing sealant in a joint gap between two aircraft parts, the sealant smoothing tool comprising: a main body comprising a base surface for abutting against and sliding along a top surface of the aircraft parts, a spatula holder for holding a spatula, the spatula holder being configured to movably mount the spatula relative to the main body, and a resilient biasing member, configured to provide a biasing force between first and second portions of the resilient biasing member, the first portion being attached to the main body and the second portion being configured to contact against the spatula or the spatula holder, such that in use, when a spatula is held by the spatula holder and when the base surface abuts against and is slid over the top surface of the aircraft parts, the second portion of the resilient biasing member contacts against the spatula or the spatula holder to apply a biasing force to urge the spatula towards the sealant, such that the spatula applies a smoothing force to the sealant.

A spatula held in the spatula holder may be displaced when the base surface of the tool is abuts against the top surface of the aircraft parts. This may cause the potential energy in the resilient biasing member to increase. In other words, there is a potential energy gradient urging the spatula holder back to its original position. This may cause a spatula held in the spatula holder to apply a smoothing force to the sealant in the gap. Advantageously, this may mean that the force applied to the sealant is substantially independent of any downward force applied by the user of the smoothing tool, once the base surface is abutting against the top surface. Advantageously, this may result in the quality of the smoothing of sealant being largely independent of the operation of the sealing tool. This can result in the sealant being applied correctly the first time it is applied, and reduces the likelihood that the sealant will need to be re-applied at a later date. This may reduce the manufacturing costs, and increase the speed of sealing of the at least two aircraft parts. The smoothing force that is applied during use may be a substantially constant smoothing force.

The base surface may be substantially planar to allow the tool to be used on a joint on a low curvature or flat surfaces of a wing, for example. The base surface may act as a guide for the tool, as it is moved across the gap. Alternatively, the base surface may be curved. A curved base surface may be suitable for use on a surface with uniform curvature in one or two directions. A curved base surface may be suitable for use on a longitudinal fuselage joint, or a dome, for example.

The smoothing force applied to the sealant may urge the sealant into the joint gap between the aircraft parts. In other words, the smoothing force may push the sealant deeper into the gap. Advantageously, this may help prevent the formation of air pockets or the like at the bottom of the gap.

The application of the smoothing force may ensure that that the height of the sealant is consistent with respect to the height of the parts/top surface. This is particularly important, as the sealant may shrink on curing, and a consistent height of sealant before curing will ensure even shrinkage of the sealant upon curing and a predictable final level of cured sealant.

The top surface of the aircraft parts may refer to a top surface of one of the aircraft parts or both top surfaces of the two aircraft parts Preferably, the second portion of the resilient biasing member is attached to the spatula holder. This allows for the resilient biasing member to provide a biasing force to the spatula via the spatula holder.

Preferably, the spatula holder, resilient biasing member and main body of the tool are integrally formed. This improves the ease in which the tool can be cleaned. This also increases the ease in which the tool is manufactured. The tool may further comprise a spatula, also integrally formed with the spatula holder, resilient biasing member and main body of the tool. Optionally, the spatula is made of non-metallic material, such as polymeric material. Optionally the spatula is configured such that it cannot cut or scratch the sealant and/or paintwork of the aircraft parts on which it is used. In this connection, the spatula may comprise generally rounded edges, for example. Alternatively or additionally, the spatula may be formed of a sufficiently soft material such that it is not capable of scratching the paint and or aircraft part on which it is used. For example, the material from which the spatula is formed may have a lower scratch hardness or indentation hardness value than that of the paint or aircraft parts. Optionally, the tool is additively manufactured. The tool being additively manufactured allows it to be manufactured to the specification of the user of the tool, such as the hand size of the user, or adapted for sealing a particular part of an aircraft (for example, by changing the width of the spatula such that it is similar to the width of the gap to be sealed).

The shape of the resilient biasing member and the material it is formed from may provide the resilient biasing. For example, the resilient biasing member linking the spatula holder and main body may relatively thin.

The smoothing force provided by the resilient biasing member may be quantified as the force needed to be applied to the spatula in order to bring it level with the base surface of the tool. In other words, the smoothing force may be quantified as the force needed to overcome the biasing force of the resilient biasing member. The biasing force of the resilient biasing member may be proportional to the shape of the biasing member (e.g. its cross-sectional area) and the material properties (e.g. Young's modulus and bulk modulus) of material that the biasing member is made of and the distance that the biasing member is deflected, in use.

Preferably, the spatula holder comprises a mounting on the main body for moveably mounting a spatula to the main body. Even more preferably, the spatula holder comprises a mounting on the main body for pivotally mounting a spatula to the main body. The mounting may be a hinge. The mounting may further comprise a pin structure having at least two interlocking parts, the pin structure suitable for mounting a spatula to the hinge on the main body of the tool. The movable interlocking parts may allow the pin to reversibly and removably mount a spatula to the base of the tool. A first part of the two interlocking parts may comprise one or more resiliently deformable protrusions. A second part of the two removable interlocking parts may comprise a cavity suitable for (releasably) engaging the one or more resiliently deformable protrusions.

Preferably, the resilient biasing member comprises a spring. The first and second portion of the resilient biasing member may be a first and second portion of a spring. The second portion of the spring may be configured to resiliently contact against the spatula. A spring may advantageously allow for a predictable smoothing force to be applied in use, that results from the spring constant of the spring used.

Preferably, the mounting on the main body for moveably mounting a spatula to the main body and the resilient biasing member form a sprung hinge. Using a sprung hinge in this way allows for the manufacture of the tool to be simple, when compared to a structure that has a separate hinge and biasing member (e.g. the same mounting means can be used for both the spring and the hinge). The (sprung) hinge may comprise a clevis pin.

Preferably, the resilient biasing member comprises a mechanically compliant rod wherein the mechanically complaint rod is integrally formed with the main body. The mechanically compliant rod is a relatively straight part of the tool (e.g. compared to a coil spring) that is sufficiently compliant such that it behaves as a resilient biasing member. The mechanically compliant rod may be substantially curved and/or curvilinear. The shape of the rod (for example, how thick or thin it is) may be selected in view of the strength of the material out of which it is made, and the desired resilient biasing properties for the resilient biasing member. The mechanically compliant rod may be part of a joint between the spatula and the main body. Alternatively or additionally, the mechanically compliant rod may be a protrusion from the main body.

Advantageously, this allows the smoothing force to be supplied as a result of exploiting the mechanical properties of the material(s) that the tool is made of, without the need of providing a separate resilient biasing member in the form of a coil spring or the like. Thus, the tool may not require a spring in order to exert an urging force onto the sealant. This advantageously reduces the cost of manufacture and improves the reliability and ease of maintenance of the tool.

Preferably, the smoothing force is between 10 N and 60 N. This amount of force is preferable, as it helps ensure that that the sealant is reliably pushed into the gap. However, the force is low enough such that any resultant forces on the main body are not great enough to push the tool away from aircraft parts in use. In other words, the resultant forces on the main body are relatively low, and as a result, the force required by the operator of the tool to keep the base surface of the tool flush with the top surface of the aircraft parts is low. This increases the ergonomics of the tool, and reduces the strain on the wrist of a user of the tool.

Optionally, the smoothing force is between 20 N and 40 N. Optionally, the smoothing force is between 25 N and 35 N. Optionally, the smoothing force is approximately 30 N.

Preferably, the tool further comprises a spatula held by the spatula holder. The spatula preferably comprises a smoothing tip at a first end. The smoothing tip may have a width, the width of the smoothing tip approximately corresponding to a width of the gap to be sealed by the tool. Alternatively or additionally, the width of the smoothing tip may be narrower than the total width of any adhesive tape used to mask the surfaces of the aircraft parts adjacent to the gap. A spatula of width less than the width of masking tape will reduce the risk of the sealant spreading off the tape onto the adjacent panel surfaces. The spatula may comprise a relatively soft material (i.e. a material that is soft enough to be cut by a conventional hand saw or similar tool). This may allow the smoothing tip of the spatula can be cut to a desired width by a user of the tool.

The spatula may be fixedly held by the spatula holder. Alternatively, the spatula holder may moveably mount the spatula to the main body of the tool.

Preferably, the tool further comprises a spatula fitted to the spatula holder wherein at least part of the spatula extends beyond the base surface of tool is free from external contact force. The spatula extending below the base surface of the tool allows the spatula to press into the gap in which the sealant has been deposited. Thus, when the base of the tool is abutted against the top surface of the aircraft parts, an external contact force is applied to the tool, and the spatula raises such that its smoothing end is substantially in line with the base surface of the tool. This raising of the spatula imparts an increase in the stored elastic energy of the resilient biasing member. This is due to the spatula being displaced from its neutral position (i.e. where the elastic potential energy is substantially zero). Optionally, part of the spatula may extend below the base surface of the tool by a distance between 1 mm and 10 mm when the base surface is not abutting a surface. It may be that part of the spatula extends below the base surface of the tool by a distance between 2 mm and 6 mm when the base surface is not abutting a surface. It may be that at least part of the spatula extends below the base surface of the tool by approximately 2 mm when the base surface is not abutting a surface.

According to a second aspect of the invention, there is provided a sealant smoothing tool for smoothing sealant in a gap between two aircraft parts, the sealant smoothing tool comprising: a main body comprising a base surface for abutting against and sliding along a top surface of the aircraft parts, a spatula holder for holding a spatula, the spatula holder being configured to movably mount the spatula relative to the main body, wherein the spatula holder comprises a cavity for receiving a spatula and a releasable fixing for releasably holding a spatula in the cavity and, wherein the base surface is arranged to guide the spatula holder relative to the top surface of the two aircraft parts.

The spatula holder comprising a releasable fixing may allow for the tool to be quickly and easily fitted with a variety of different spatulas. This may allow for a spatula to be chosen that it is more suitable for use on a given aircraft part, for example a wider spatula would be more suitable for use on an area where the gap to be filled with sealant between the parts is wider. This may allow the tool to be used in the sealing of gaps between different types and shapes of aircraft parts by allowing a suitable spatula to be chosen for a given gap.

Advantageously, using a spatula that approximately corresponds to the width of the gap to be sealed can improve the precision of the tool, and reduces the amount of sealant that is spread from the gap onto the external surfaces of the aircraft parts. This may help ensure that any sealant that is spread from the gap onto the surfaces of the aircraft parts is only spread onto regions of the aircraft parts that have been covered with adhesive tape. This can result in a more even finish of the sealing and reduce the cleaning task when adhesive tape is removed after smoothing. A spatula may also wear out when used repeatedly, especially (but not exclusively) in the case where the spatula and/or tool is made of a polymeric material. Thus, a tool that allows for releasable mounting of a spatula reduces material waste, as only the spatula need be replaced when worn out, and not the entire tool.

Preferably, the releasable fixing of the tool comprises a clamp mounting, the clamp mounting comprising two or more jaws arranged for gripping a spatula to hold it in place within the cavity. The clamp mounting may comprise two or more jaws suitable for gripping a distal end of a spatula to hold it into place within the cavity.

Preferably, the releasable mounting of the tool comprises a screw mounting. The screw mounting may be suitable for receiving a spatula having a helical screw thread.

Preferably, the releasable mounting of the tool comprises a bayonet mounting. The bayonet mounting is suitable for receiving a spatula comprising one or more pins suitable for communication with said bayonet mounting. The bayonet mounting may comprise one or more L shaped slots.

Preferably, the releasable mounting of the tool comprises a cavity suitable for receiving a spatula, said cavity arranged such that pushing a spatula into the cavity causes the spatula to be held within the cavity. The cavity may be arranged such that it provides a cam surface for the spatula. The cavity may act as a push fit fixture for the spatula. The spatula may be held in the cavity by friction.

The releasable mounting of the tool may comprise a hinge on the main body of the tool and a pin structure having at least two interlocking parts, the pin structure suitable for mounting a spatula to the hinge on the main body of the tool. A first part of the two removable interlocking parts may comprise one or more resiliently deformable protrusions. A second part of the two removable interlocking parts may comprise a cavity suitable for (releasably) engaging the one or more resiliently deformable protrusions. The interlocking parts may allow the pin to reversibly and removably mount a spatula to the main body of the tool (e.g. when the parts are interlocked, the spatula is attached to the main body of the tool via the hinge, and when the parts are not interlocked, the spatula can be removed from the tool). Alternatively or additionally, the pin structure may comprise a clevis pin.

Preferably, the spatula holder is configured such that a spatula held within the spatula holder is held at an acute angle to the base surface of the tool. The angle of the spatula relative to the base surface of the tool corresponds to the angle of the spatula relative to the surface of the sealant. If the angle between the spatula and the surface of the sealant is too low, after smoothing, the sealant will protrude too high above the top surface of the aircraft parts. Alternatively, if the angle is too steep then, after smoothing, the sealant will be too far below the top surface of the parts (in other words, the sealant will be too deep into the gap). Therefore, having a spatula arranged to be held at an angle relative to the base surface of the tool can help maintain the spatula at an optimal angle of incidence relative to the surface of the sealant.

Optionally, the angle between the longitudinal axis of the spatula and the base surface of the tool is between 10 degrees and 60 degrees. Optionally, the angle between the longitudinal axis of the spatula and the base surface of the tool is between 15 degrees and 45 degrees. An angle in this range ensures that the spread sealant is not too proud, or too shallow, in relation to the depth of the gap between the aircraft parts.

Preferably, the main body of the tool comprises a pair of tracks, each providing a portion of the base surface, and wherein the spatula holder configured such that a spatula held by the spatula holder is held between the tracks and wherein the spatula holder configured such that a spatula held by the spatula holder is held between the tracks. The pair of tracks may act to constrain the sealant as it is smoothed, and prevent the sealant from flowing out over the top surface of the aircraft parts. The internal distance (i.e. the distance between the innermost surface of the each track) between the two tracks may be between 1 cm and 10 cm. Having the tracks arranged in this way may help ensure any sealant that flows onto the top surface of the aircraft parts only flows onto regions that would be covered with adhesive tape by the operator of the tool.

Preferably, each of the tracks of the pair of tracks has a leading edge, wherein the leading edge comprises a chamfer. In use, the tool may be moved over the top surface of the aircraft parts, such that the pair of tracks remain approximately parallel to the gap. The leading edge of the tracks may be the foremost edge of the tool, when the tool is moved across a gap between two parts. The leading edge being a chamfer may prevent the tool from catching with any adhesive tape or the like that has been positioned along the edges of the parts, as the tool is moved across the top surface of the parts to smooth the sealant in the gap. This improves reliability of the tool, and allows it to be used quickly on sealing operations. The chamfer may comprises a rounded surface. The chamfer may comprise a filleted surface. For example, it may have no sharp edges.

The tool may comprise one or more markers for aligning the spatula with the gap. The markers may be on the main body of the tool. The one or more markers may help the user keep the spatula aligned with the gap in use, such that the spatula is positioned over the gap as the tool is moved across the aircraft parts to be sealed. There may be two markers. The two markers may each have a longitudinal axis. The longitudinal axis of the two markers may be the same for both markers. In use, the two markers being parallel to the gap that is being sealed may indicate that the tool is correctly aligned. If the two marks are not parallel to the gap to be sealed, the user may adjust the orientation of the tool until they are parallel to the gap to be sealed, to align the tool. The two markers may comprise a first marker at the front of the tool and a second marker at the rear of the tool. It may be that the one or more markers comprise one or more grooves in the main body of the tool.

Preferably, the main body of the tool comprises a handle that extends away from the base surface of the main body of the tool in a direction substantially perpendicular to the base surface of the tool. This allows the user's hand to be in a neutral position with respect to the main body of the tool, and improves the ergonomic performance of the tool.

Preferably, the main body of the tool comprises Nylon. Use of Nylon is advantageous as it is hard enough such the tool is resistant to wear, but not so hard that the tool scratches the aircraft parts and/or paint on the aircraft parts. In addition, Nylon is drop resistant, such that if the tool is dropped in use, for example, from the height off the ground of the wing of a civil airliner, the tool will not smash. Even more preferably, the main body of the tool comprises additively manufactured Nylon PA12.

According to a third aspect of the invention there is provided a kit of parts comprising a sealant smoothing tool as claimed in any preceding claim, wherein the kit of parts further comprises one or more spatulas configured to be held by the spatula holder of the sealant smoothing tool.

According to a fourth aspect of the invention, there is provided a method of smoothing sealant in a gap between at least two aircraft parts, the method comprising using the tool of any preceding claim.

According to a fifth aspect of the invention there is provided a method of smoothing sealant in a gap between two aircraft parts, the two aircraft parts comprising a first part and a second part of an aircraft, the method comprising: providing a tool of the first or second aspect of the invention, wherein a spatula is held in the spatula holder, applying a sealant into the gap, abutting the base surface of the tool with the two aircraft parts, such that the base surface of the tool is in contact with a top surface of the aircraft parts, and moving the tool along the gap, such that sealant is smoothed in the gap by the spatula of the tool.

According to a sixth aspect of the invention there is provided an aircraft comprising two aircraft parts that have been sealed using the tool of the first or second aspect of the invention, and/or by performing the method of the fourth or fifth aspect of the invention.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1A:
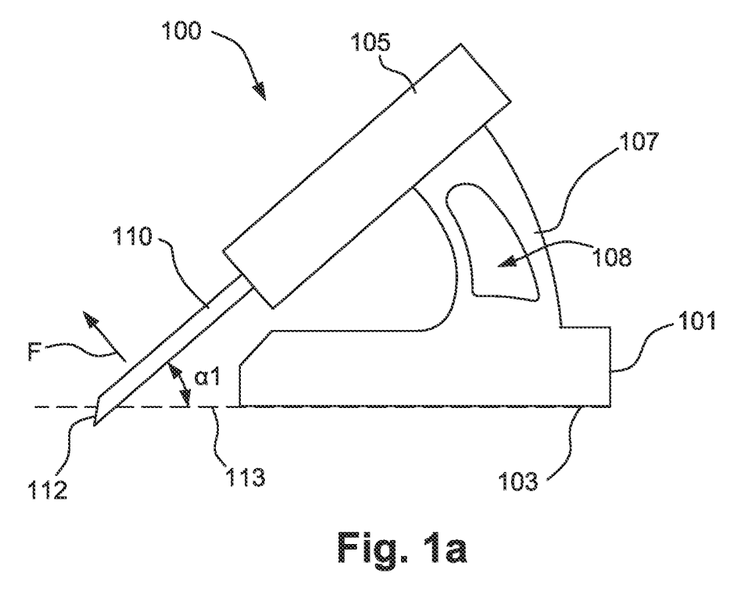
FIG. 1a shows a side on view of a sealant smoothing tool according to a first embodiment of the invention.

FIG. 1a shows a side on view of a sealant smoothing tool 100 according to a first embodiment of the invention. The smoothing tool 100 has a main body 101 having a base surface 103. There is a spatula grip 105, connected to the main body 101 though a compliant joint 107. The main body 101, spatula grip 105 and compliant joint 207 are all formed as a single piece of polymeric material. The main body 101, spatula grip 105 and compliant joint 107 are additively manufactured out of nylon as a single tool component. This single component is the tool 100 of the present embodiment. The compliant joint 107 of the tool is a piece of Nylon that is shaped, in this case by providing a hole 108 in the tool, that allows the smoothing tool 100 to flex so the spatula grip 105 can rotate relative to the base surface 103.

Figure 1B:
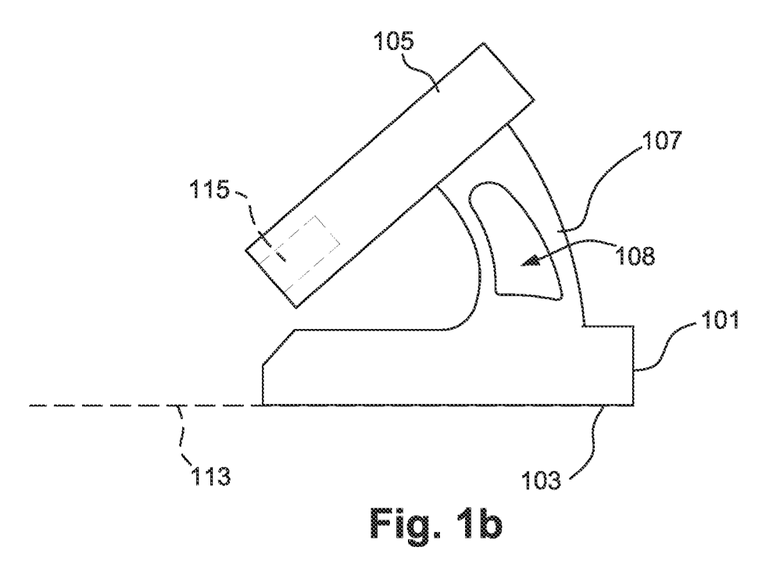
FIG. 1b shows a side on view of the sealant smoothing tool of FIG. 1a without a spatula fitted to it.

A removable spatula 110 is held by the spatula grip 105 within a cavity of the spatula grip 105 (shown in FIG. 1b). The spatula 110 is a removable and consumable component, which can be replaced as necessary (e.g. if the spatula is worn out, or if the tool is to be used to seal a gap to which the spatula 110 is not suited) by fitting a new spatula 110 to the spatula grip 105 of the tool 100. The spatula 110 is a straight, flat edged spatula and is also made of Nylon. As the spatula 110 is held by the spatula grip 105, the spatula can also rotate relative to the base surface 103, as a result of the compliant joint 107.

The spatula 110 is held in the spatula grip 105 such that it is held at an angle $\alpha 1$ of 40° degrees relative to the base surface 103. The spatula has a tip 112 that (when the compliant joint is not flexed) extends 2 mm below the base plane 113 defined by the surface of the base surface 103. The width of the spatula tip is not visible from this view, but is around 25 mm (and thus, the smoothing tip can be used to smooth sealant in a gap with a width of approximately 25 mm).

The tool 100 of FIG. 1a will now be described in use, to smooth sealant that has been deposited to fill a gap between two aircraft parts. The two aircraft parts are, for example, the external panels of a top surface of a civil aircraft wing. In use, the base surface 103 of the tool 101 is placed on the top surface of the aircraft parts. Thus, the base surface 103 of the tool, and therefore the base plane 113 of the tool are parallel to the top surface of the aircraft panels. The base surface 103 of the tool is held against the top surface of the aircraft parts, and subsequently slid over the top surface of the parts. The spatula tip contacts the sealant that is in the gap of the aircraft parts and this causes the spatula tip to displace due to the reaction forces F exerted on the tip 112 by the sealant. The tip 112 is displaced by 2 mm. The reaction force F is 30 N. The tip being displaced in this way causes elastic potential energy to be stored in the compliant joint 107. The elastic potential energy stored in the joint 107 causes the smoothing tip 112 to be urged back towards the sealant in the gap, thus applying a relatively constant force to the sealant in the gap as the tool is moved over the surface of the aircraft panels. This helps ensure a smooth finish of sealant.

The angle of the spatula 110 to the surface of the sealant is observed to be critical. If the angle between the tool and the surface of the sealant is too low, the sealant will protrude too high above of the surface and will spread over the top surface of the aircraft panels, causing a poor visual finish. If the angle is too steep, then sealant surface, after smoothing, will be too far below the surface of the aircraft panels, and will not sufficiently protect the gap between the panels from corrosion or the like. Thus, the spatula 110 being held at an angle α1 of 40° as the tool is used helps ensure that the sealant is smoothed such that the sealant does not extend too shallow or too proud of the gap to be filled. It will be understood that the spatula is substantially held at an angle of 40° degrees, and that this angle will change by a relatively small amount due to the defections of the spatula tip as the tool is used to smooth the sealant.

The force applied to the sealant from the spatula 110 is also important. Applying a consistent force on the sealant helps to ensure an even distribution of sealant, and will help ensure that the sealant is pushed all the way into the gap, such that there are no air pockets or the like in the sealant. In the present embodiment of the invention, a smoothing force (in other word the downforce of the spatula, normal to the surface) of 30 N is applied by the spatula in use.

Figure 2:
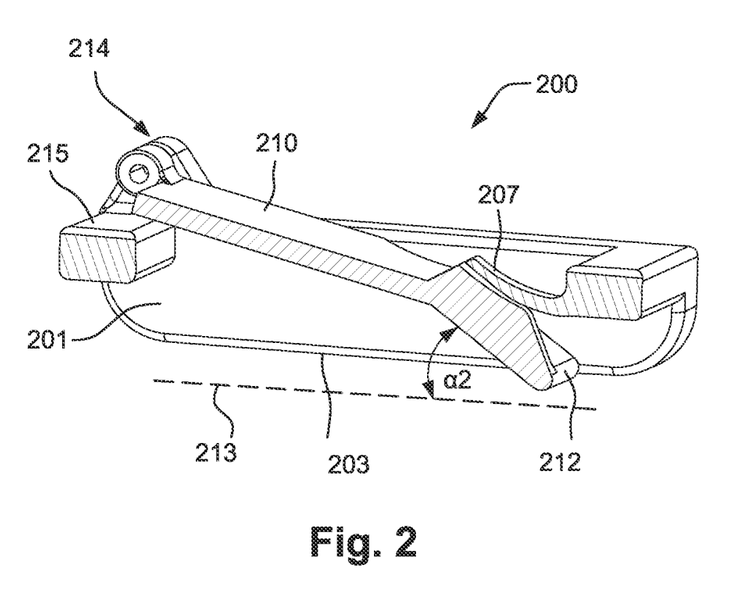
FIG. 2 shows a section view of a sealant smoothing tool according to a second embodiment of the invention.

FIG. 2 shows a section view of a sealant smoothing tool 200 according to a second embodiment of the invention. In this view, the handle of the tool is not shown, to improve the clarity of the view shown. The sealant smoothing tool 200 comprises a main body 201 and a spatula 210 pivotally mounted at a first end to the main body 201 via a hinge 214. Thus, the spatula can rotate about the hinge 214.

The spatula 210 has a smoothing tip 212 at a second opposite end, distal to the first end where the spatula is mounted to the hinge 214 of the main body 201 of the tool 200. The main body 201 of the tool has a base surface 203. The smoothing tip has a width of around 50 mm (and thus, the smoothing tip can be used to smooth sealant in a gap with a width of up to approximately 5 mm). The dimensions of a gap such a tool would be used to seal would be a gap with a width of 0.5 mm to 5 mm, and depth of typically 4 mm, for example.

The main body 201 of the tool 200 has a biasing arm 207 that extends from it. The biasing arm is arranged such that the smoothing tip 212 abuts against the biasing arm 207 when the spatula is rotated upwards away from the base surface 203. The biasing arm 207 is integral to the main body 201 of the tool. The biasing arm is made of Nylon, which is a compliant polymeric material. The biasing arm 207 is curvilinear in shape, and the biasing arm 207 is shaped so that as much surface area of the smoothing tip 212 as possible is in contact with the biasing arm 207 when the smoothing tip 212 abuts against the biasing arm 207. Both the shape and material of the biasing arm 207 allow it apply a resultant force to the smoothing tip 212 of the spatula 210 when the smoothing tip 212 is pushed against the biasing arm 207.

In use, the smoothing tip may be displaced by approximately 2 mm, by contacting sealant, thus pushing the smoothing tip into the biasing arm 207. The resultant force applied to the biasing arm is approximately 30N. When the spatula 210 is displaced, the resultant forces mean that it is held at an angle α2 of 35° relative to the base surface 203. Crossbar 215 limits the range of angles the spatula 210 can rotate through, and prevents the smoothing tip 212 from dropping too low (i.e. rotating too far past) the base surface 203. Similarly to the first embodiment of the invention, the spatula 210 extends below the base plane 213 defined by the surface of the base surface 203 when the tool is at rest (i.e. when the biasing arm 207 is not flexed due to being pressed against a surface).

Figure 3:
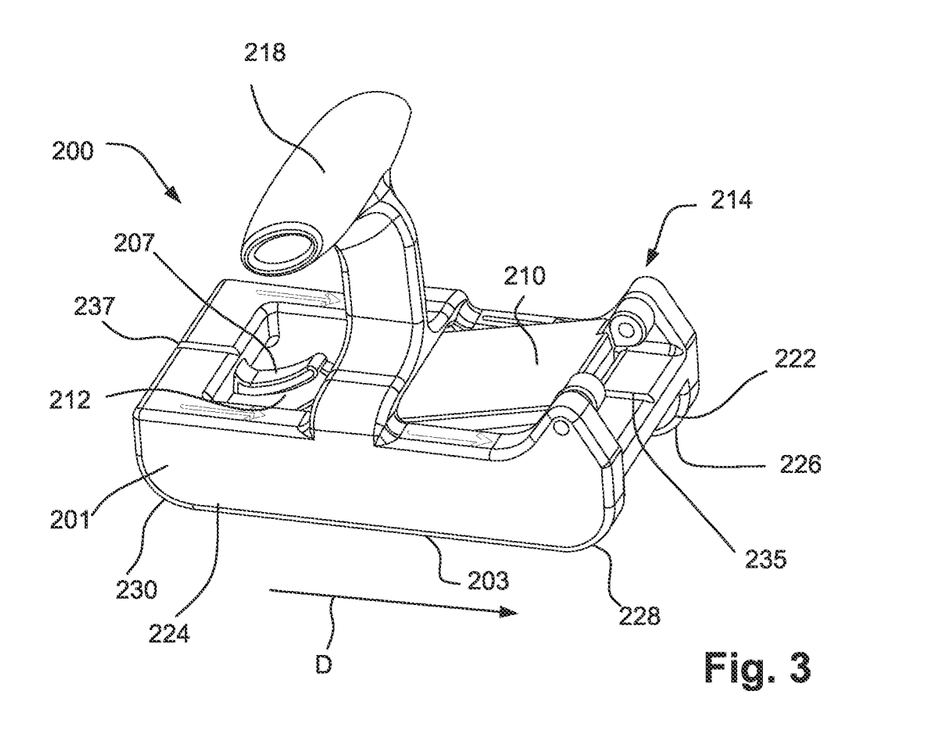
FIG. 3 shows a perspective view of a sealant smoothing tool of FIG. 2.

FIG. 3 shows a perspective view of a sealant smoothing tool of FIG. 2. In this perspective view, the handle 218 is visible. The handle 218 is ergonomic, and is integral to, and extends from the main body 201 of the tool. The handle 218 is shaped such that a user grasping the tool grasps it with their wrist in a neutral position where their wrist is not rotated. For this reason the handle is shaped in a "T" shape. The handle stands at a suitable distance from the tool body such that the hands of most users will be able to grip the handle without obstruction from the tool body. The handle is of a rounded shape and of a diameter suitable to enable a comfortable and stable grip for users with small or large hands alike. The tool therefore facilitates drawing of the tool along the joint at a consistent speed and square and parallel to the joint without applying strain to a user's wrist.

The base surface 203 has a pair of tracks, a first track 222 and a second track 224. The hinge 214 is located such that a spatula 210 held by the hinge 214 is positioned substantially between the first track 222 and the second track 224. Similarly, the biasing arm 207 is located between the first track 222 and second track 224. The direction of movement of the tool in use is shown by the arrow D. The first track 222 and the second track 224 each have a leading edge 226 and 228, which are the foremost edges of the tool 200 relative to the intended direction of movement D in use.

Each leading edge is chamfered such there are no sharp corners on the leading edges 226, 228 of the tool. The first track 222 and the second track 224 also each have a trailing edge 230 (only one of which is visible in this view), which are the rearmost edges of the tool 200 relative to the intended direction of movement D in use.

A groove 235 at the front of the tool and a similar groove 237 at the rear of the tool provide a visual means of assisting centring and/or aligning of the tool in the relation to the gap when it is pushed along. The grooves 235, 237 are used as a type of sight, the grooves at the front and back being aligned above the gap by the user as the tool is pushed along. The grooves 235, 237 are located in the centre of the top surface of the main body. The grooves 235, 237 are arranged such that they have a longitudinal axis that is parallel to the direction of movement D that the tool is moved in, in use.

Each trailing edge is chamfered such there are no sharp corners on the trailing edges 230 of the tool. The spatula 210 is removable, and can easily be replaced, for example by a spatula with a different width of smoothing tip. The internal distance (i.e. the distance between the innermost surfaces) between the tracks 222, 224 is 7 cm. The smoothing tip of the spatula is rounded such that it cannot scratch the paint or aircraft part on which it is used.

Figure 4:
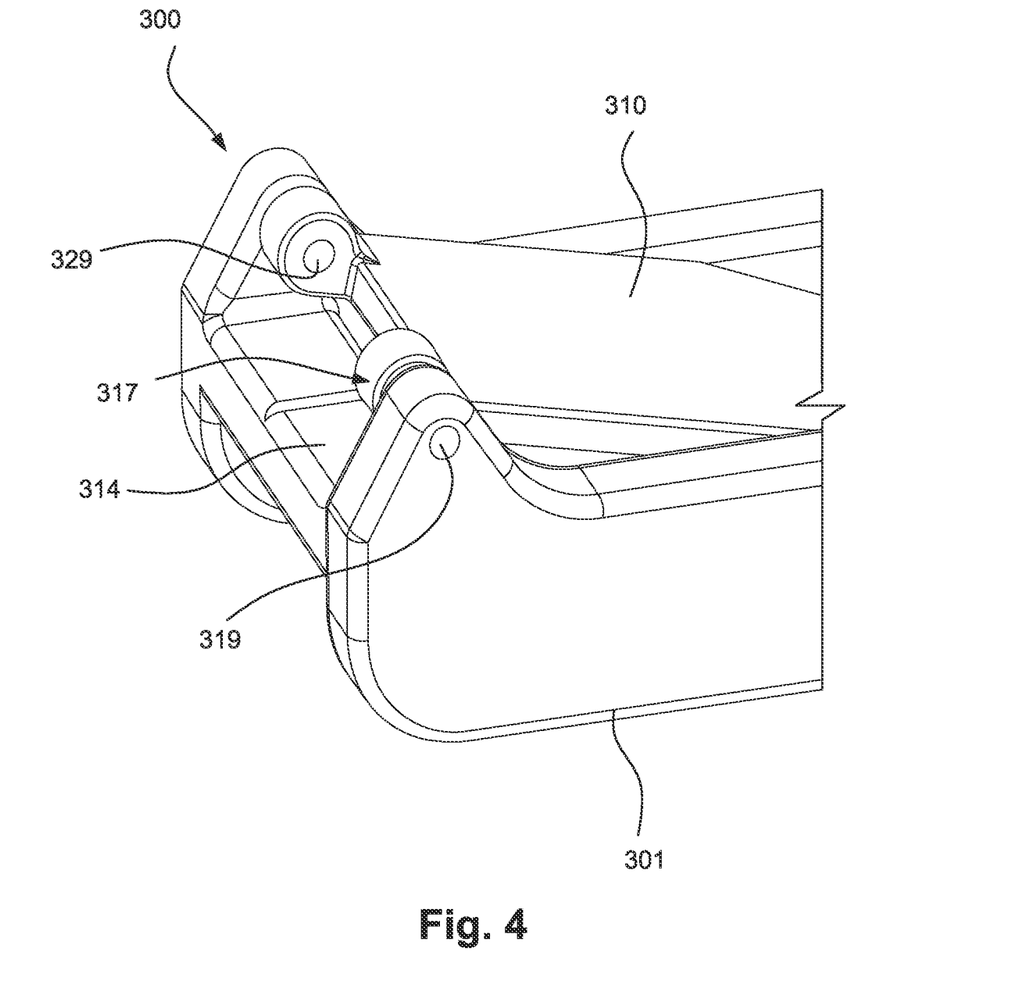
FIG. 4 shows a close up view of a hinge of a smoothing tool according to a third embodiment of the invention.

FIG. 4 shows a close up view of a hinge 314 of a smoothing tool 300 according to a third embodiment of the invention. The smoothing tool of the third embodiment of the invention is substantially the same as in structure as the tool of the second embodiment of the invention, though the tool does not have a biasing arm, and instead has a sprung hinge 314.

The hinge 314 acts as a sprung hinge due to the inclusion of a spring 317 that is located between the spatula 310 and the main body 301. There is a pin 319 that holds the spatula 310 to the main body 301 at the point of hinge 314. The pin 319 can be threaded through a pin recess 329 in the spatula. In use, the spring 317 applies a force to the spatula 310, such that a smoothing tip of the spatula (not shown here, but having substantially the same form as the smoothing tip of the sealant smoothing tool of the second embodiment of the invention) applies a constant force to sealant as the tool is moved over the surface of the two aircraft parts to be sealed, for a given displacement of spatula relative to the base.

Figure 5A:
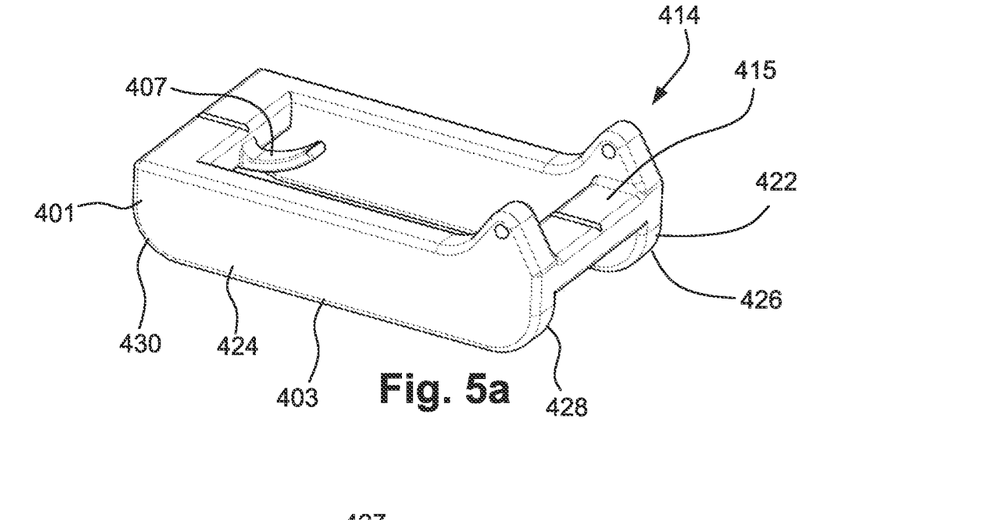
FIG. 5a shows a main body of the sealant smoothing tool of FIG. 2.
Figure 5B:
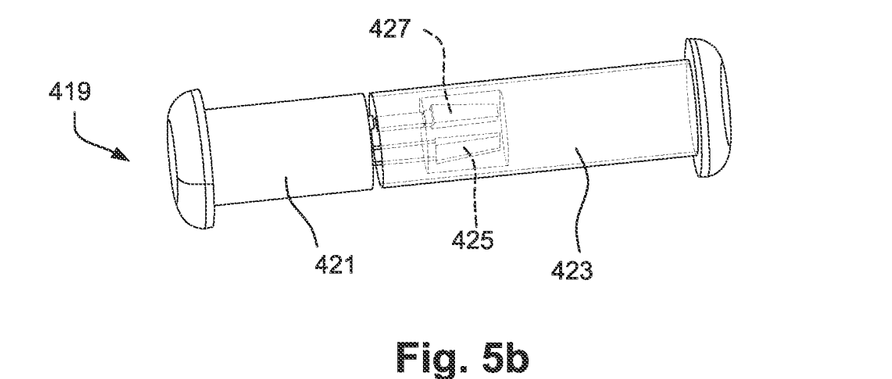
FIG. 5b shows a sectional view of the hinge pin of the sealant smoothing tool of FIG. 2.
Figure 5C:
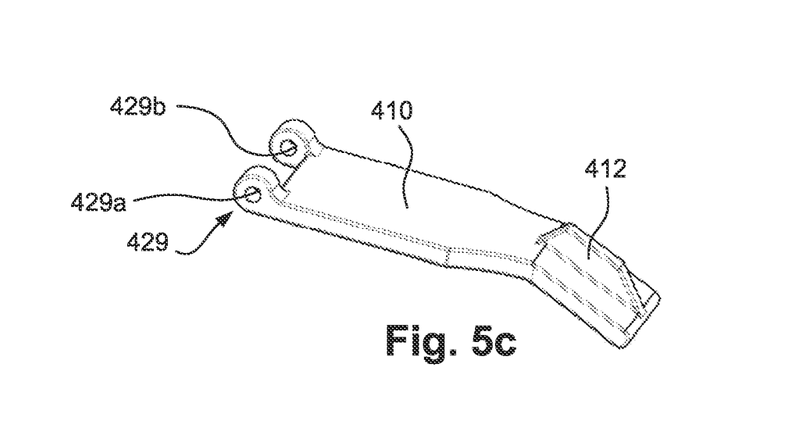
FIG. 5c shows a spatula of the sealant smoothing tool of FIG. 2.

FIGS. 5a-5c each show a different component of a kit of parts, which can be assembled to form the sealant smoothing tool shown in FIG. 2.

FIG. 5a shows a main body of the sealant smoothing tool of FIG. 2. The main body 401 has substantially the same features as the main body of the sealant smoothing tool of the second embodiment of the invention.

The main body 401 of the sealant smoothing tool 400 has two tracks 422 424, having a common base surface 403. The tracks are chamfered along their leading edges 426, 428, and also their rearmost edges 430. The main body 401 has a hinge 414 to which a spatula can be pivotally mounted. The hinge 414 is not a sprung hinge. The hinge has a first recess 414a on a first side of the base surface 403, and a second recess 414b on a second side of the base surface 403. The main body 401 has a crossbar 415 for restricting the angle of rotation possible by a spatula mounted to the main body 401. There is a biasing arm 407 for applying a resilient biasing force to a spatula mounted on the main body 401.

FIG. 5b shows a sectional view of the hinge pin of the sealant smoothing tool of FIG. 2. The hinge pin 419 has a first part 421 and a second part 423. The first part 421 has protruding portions 427 that extend from it. The second part 423 has a cavity 425 that allows for the protruding portions 427 to be held in the cavity in the form of a "push fit" style fitting. Thus, the first part 421 and the second part 423 can be fixed together in a push fit manner.

FIG. 5c shows a spatula of the sealant smoothing tool of FIG. 2. The spatula 410 has a smoothing tip 412. The spatula also has pin recesses 429, including a first pin recess 429a and a second pin recess 429b, that can receive the hinge pin 419.

The assembly of the tool, from the parts shown in FIGS. 5a to 5c will now be described. The pin recesses 429 are aligned with the hinge 414 of the main body 401. The first part of 421 of the pin 419 is inserted though the first pin recesses 429a through the first recess 414a, and the second part of 423 of the pin 419 is inserted though the second pin recesses 429b through the second recess 414b. The first and second part 421, 423 of the pin 419 are then pushed together until protruding portions 427 are secured in the cavity 425. This secures the spatula 410 to the main body 401 at the hinge 414, such that the spatula 410 can pivotally rotate about the longitudinal axis of the hinge 419.

Figure 6:
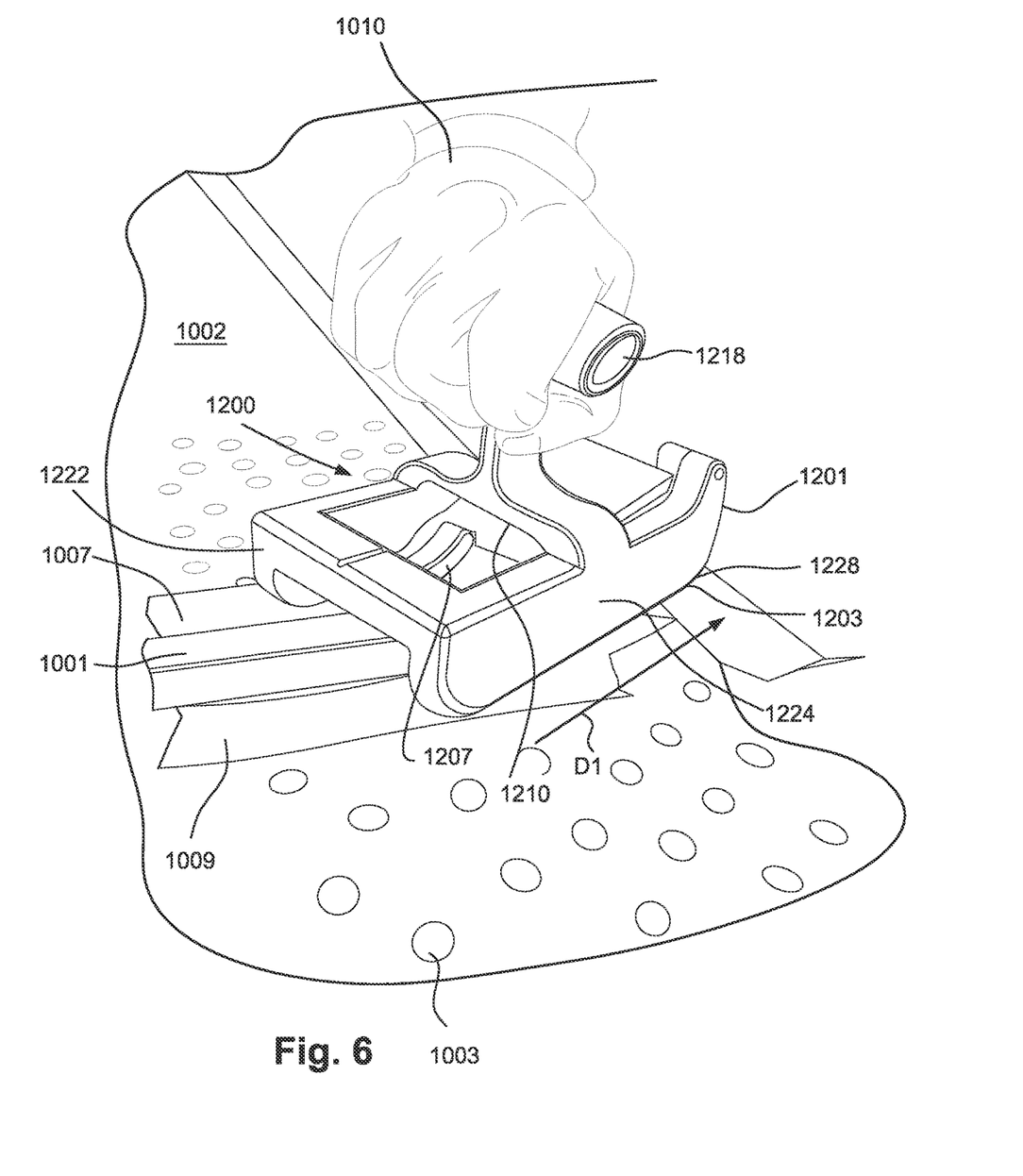
FIG. 6 shows an image of the sealant smoothing tool of FIG. 2 and FIG. 3 in use smoothing sealant between a first wing panel of an aircraft and a second wing panel of an aircraft.

FIG. 6 shows an image of the sealant smoothing tool of FIG. 2 and FIG. 3 in use smoothing sealant between a first wing panel of an aircraft 1002 and a second wing panel of an aircraft 1003. Parts of the tool of the second embodiment of the invention are shown again here, with 1000 added to the reference numeral.

Prior to commencing the method of smoothing the sealant, the gap 1001 to be sealed is cleaned, the sealant is mixed up and adhesive tape 1007, 1009 is placed along the edges of the panels 1002, 1003 that border the gap. Sealant is then applied in the gap by means of a conventional sealant dispensing cartridge gun. The method of using the sealant smoothing tool 1200 as shown in the image of FIG. 6, to smooth sealant positioned in a gap 1001 between the two wing panels of an aircraft 1002 and 1003 will now be described.

The main body 1201 of the sealant smoothing tool 1200 is placed on the wing aircraft panels 1002, 1003 such that the first track 1222 of the tool is placed on the first wing aircraft panel 1002, and the second track 1224 is placed on the second wing panel 1003 such that the base surface of the tool 1203 abuts against the panels 1002, 1003. Thus, the first track 1222 and the second track 1224 straddle the gap 1001 between the two panels. This results in the spatula 1210 being held over the gap 1001 to be sealed, and contacted against the sealant.

The user 1010 then applies a relatively small amount of downward pressure on the handle 1218 (in other words, they apply a force approximately perpendicular to the plane of the panels which are being sealed), whist gripping the handle 1218 such that their wrist is in a neutral position. The user then begins to pull the tool 1200 along the surface of the panels 1002, 1003 in the direction D1, whilst keeping the base surface 1203 of the tool flush with the panels 1002, 1003. This action causes the smoothing tip (not visible in this figure) of the spatula 1210 to react against the sealant in the gap, and bias against the biasing arm 1207.

The biasing arm, in turn applies a force to the smoothing tip, such that the smoothing tip is held at an angle of approximately 35° relative to the sealant, and applies a relatively constant force to the sealant, as the tool 1200 is moved across the gap 1001. This helps ensure an even smoothing of the sealant in the gap 1001, and improves the reliability and repeatability of the smoothing method.

Any sealant that is displaced from the gap during the method of using the tool is advantageously constrained on the area of the panels covered by the adhesive tape 1007, 1009. This occurs due to the internal distance between the tracks 1222 and 1224 being smaller than the width of the surface area covered by the gap to be sealed 1001 and the adhesive tape 1007, 1009. Any sealant which is pushed out of the gap would flow over the adhesive tape 1007, 1009, and then meet one of the tracks 1222, 1224 which prevent the sealant from flowing onto the exposed outer surface of the panels 1002, 1003. This helps improve the surface finish of the sealant, and reduces cosmetic defects and the like. In turn, this improves the reliability and repeatability of the sealing process.

Advantageously, the chamfered (also known as filleted) leading edges of the tool 1228 prevent the tool from snagging on adhesive tape 1007, 1009 as the tool is pulled along the surface of the panels 1002, 1003. The tool having smoothed edges also makes it easier to clean after use.

Advantageously, the Nylon (i.e. polyamide) construction of the sealant smoothing tool 1200 means that the tool can withstand a drop of over 2 m without breaking. This is advantageous, if for example, the tool is dropped from a wing of an aircraft during use. The Nylon construction also makes the tool relatively lightweight, which reduces the strain on the wrists of the user, and allows the tool to weigh less than 600 grams. The spatula also being made of Nylon reduces the likelihood of the sealing tool scratching through the paintwork on the panels 1002, 1003 (and thus reducing the likelihood of subsequent corrosion of the panels). The Nylon construction of the sealant smoothing tool 1200 is formed by 3D printing of additively manufactured Nylon PA12, having a modulus of elasticity (for example a bulk modulus or a Young's modulus) of 40-50 MPa. The Nylon PA12 is anisotropic, and has a modulus of elasticity of 40 MPa in a first direction, and 50 MPa in a second direction.

Figure 7:
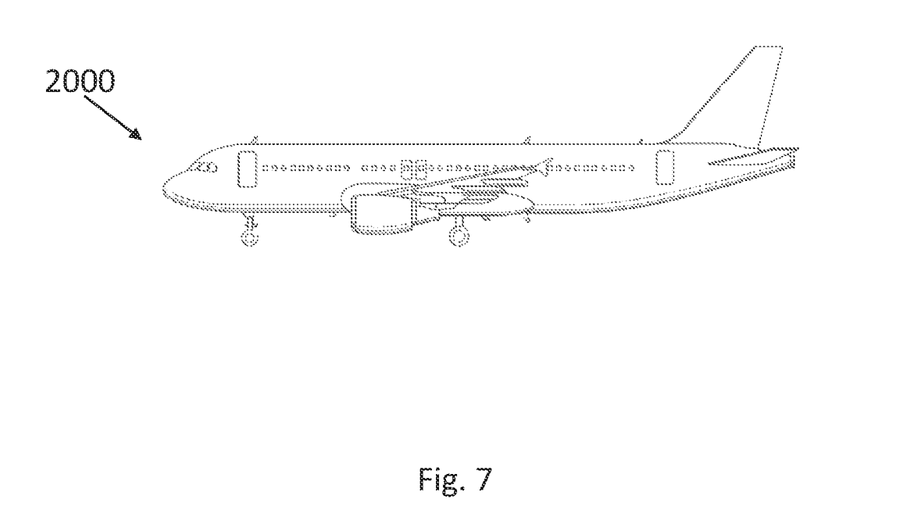
FIG. 7 shows an aircraft comprising two aircraft parts that have been sealed using the tool of FIG. 2 and FIG. 3.

FIG. 7 shows an aircraft comprising two aircraft parts that have been sealed using the tool of FIG. 2 and FIG. 3.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The tool may comprise a single piece (in other words, the tool may be integrally formed as a single unit). Thus, the spatula, spatula holder, main body of the tool, and compliant joint or biasing arm may be formed of a single piece of material. Here, the spatula may not be replaceable or removable.

The handle of the sealant smoothing tool may be shaped to a size suitable for a particular user's hand. For example, the handle may be made smaller for a user with a relatively small hand, or larger for a user with a relatively big hand. The handle is described as having a "T" shape, but any other shape, for example that allows for a substantially neutral position of the user's wrist during use may be used.

The spatula or smoothing tip itself may be resiliently deformable. This resilient deformability may arise due to the spatula or smoothing tip having a relatively long and thin shape. In such embodiments, there may be no need for a biasing arm or a compliant joint, as the spatula or smoothing tip itself may comprise the required resilient biasing properties required to supply the smoothing force to the sealant.

A sprung hinge may take any conventional form, and may be an alternative sprung hinge design according to those readily known by the skilled person, and/or a clevis pin hinge design.

Multiple spatulas may be provided in a kit of parts. The spatulas may have smoothing tips with different widths, such that the tool can be adapted for use on gaps of different widths. Alternatively, or additionally multiple spatulas of the same type can be provided in the kit of parts such that a spatula can be replaced on the tool, once a spatula has been worn out.

The sealant smoothing force (in other word the downforce of the spatula, normal to the surface) may be between 10 N and 60N, optionally between 20 N and 50 N, and optionally between 30 N and 40 N.

The smoothing tip may be displaced by between 1 mm and 6 mm, and optionally between 1 mm and 4 mm and optionally between 2 mm and 3 mm.

The width of the smoothing tip may be between 25 mm and 50 mm. For example, the width of the spatula may be 25 mm.

The spatula may be held at an angle between 15° and 60°. In yet further embodiments, it may be that the spatula is held at an angle between 15° and 45°. (such as 15°, 20° or 45°, for example).

The base surface of the sealant smoothing tool may be curved, such that the tool can be used on curved parts of an aircraft. A curved surface may allow the tool to be used on a longitudinal fuselage joint, for example.

Parts of the tool (such as the spatula) may be made of any suitable polymeric material. In addition, or alternatively, the handle of the tool may be made of wood, in alternative embodiments of the invention.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

It should be noted that throughout this specification, "or" should be interpreted as "and/or".

Although the invention has been described above mainly in the context of a fixed-wing aircraft application, it may also be advantageously applied to various other applications, including but not limited to applications on vehicles such as helicopters, drones, trains, automobiles and spacecraft.

The invention claimed is:

1. A sealant smoothing tool for smoothing sealant in a joint gap between two aircraft parts, the sealant smoothing tool comprising:
   a main body comprising a base surface for abutting against and sliding along a top surface of the aircraft parts,
   a spatula holder for holding a spatula, the spatula holder being configured to movably mount the spatula relative to the main body, and wherein the sealant smoothing tool further comprises:
   a resilient biasing member, configured to provide a biasing force between first and second portions of the resilient biasing member, the first portion being attached to the main body and the second portion being configured to contact against the spatula or the spatula holder,
   such that in use, when a spatula is held by the spatula holder and when the base surface abuts against and is slid over the top surface of the aircraft parts there is an increase in the potential energy of the resilient biasing member and a potential energy gradient urging the spatula holder back to its original position, and the second portion of the resilient biasing member contacts against the spatula or the spatula holder to apply a biasing force to urge the spatula towards the sealant, such that the spatula applies a smoothing force to the sealant.

2. A sealant smoothing tool as claimed in claim 1, wherein the spatula holder, resilient biasing member and main body of the tool are integrally formed.

3. A sealant smoothing tool as claimed in claim 1, wherein the spatula holder comprises a mounting on the main body for moveably mounting a spatula to the main body.

4. A sealant smoothing tool as claimed in claim 1, wherein the resilient biasing member comprises a mechanically compliant rod, wherein the mechanically compliant rod is integrally formed with the main body.

5. A sealant smoothing tool as claimed in claim 1, wherein the smoothing force is between 10 N and 60 N.

6. A sealant smoothing tool as claimed in claim 1, wherein the tool further comprises a spatula held by the spatula holder.

7. A sealant smoothing tool as claimed in claim 6, wherein at least part of the spatula extends beyond the base surface of the tool when the tool is free from external contact force.

8. A sealant smoothing tool as claimed in claim 1, wherein the spatula holder comprises a cavity for receiving a spatula, wherein the spatula holder is configured such that the spatula is held within the spatula holder at an acute angled to the base surface of the tool, and a releasable fixing for releasably holding the spatula in the cavity and, wherein the base surface is arranged to guide the spatula holder relative to the top surface of the two aircraft parts.

9. A sealant smoothing tool for applying sealant to a gap between two parts of an aircraft as claimed in claim 8, wherein the releasable fixing of the tool comprises one of:
   (a) a clamp mounting, the clamp mounting comprising two or more jaws arranged for gripping a spatula to hold it in place within the cavity;
   (b) a screw mounting suitable for receiving a spatula having a helical screw thread;
   (c) a bayonet mounting suitable for receiving a spatula having one or more pins suitable for communication with said bayonet mounting;
   (d) a spatula having one or more pins suitable for communication with said bayonet mounting; and
   (e) a cavity suitable for receiving a spatula, said cavity arranged such that pushing a spatula into the cavity causes the spatula to be held within the cavity.

10. A sealant smoothing tool as claimed in claim 8, wherein the spatula holder is configured such that a spatula held within the spatula holder is held at an acute angle to the base surface of the tool.

11. A sealant smoothing tool as claimed in claim 8, wherein the main body of the tool comprises a pair of tracks, each providing a portion of the base surface, and wherein the spatula holder configured such that a spatula held by the spatula holder is held between the tracks and wherein a leading edge of the tracks optionally comprises a chamfer.

12. A sealant smoothing tool as claimed in claim 8, wherein the main body of the tool comprises a handle that extends away from the base surface of the main body of the tool in a direction substantially perpendicular to the base surface of the tool.

13. A sealant smoothing tool as claimed in claim 8, wherein the main body of the tool comprises Nylon.

14. A kit of parts comprising the sealant smoothing tool as claimed in claim 8, wherein the kit of parts further comprises one or more spatulas configured to be held by the spatula holder of the sealant smoothing tool.

15. A method of smoothing sealant to seal a gap between two aircraft parts, the method comprising using the tool of claim 1.

16. A method of smoothing sealant in a gap between two aircraft parts, the two aircraft parts comprising a first part and a second part of an aircraft, the method comprising:
   providing a tool of claim 11, wherein a spatula is held in the spatula holder,
   applying a sealant into the gap,
   abutting the base surface of the tool with the two aircraft parts, such that the base surface of the tool is in contact with a top surface of the aircraft parts, and
   moving the tool along the gap, such that sealant is smoothed in the gap by the spatula of the tool.

17. An aircraft comprising two aircraft parts that have been sealed using the tool of claim 1.

* * * * *